US00RE51042E

(19) United States
(12) Reissued Patent
Zhang

(10) Patent Number: US RE51,042 E
(45) Date of Reissued Patent: Sep. 22, 2026

(54) WIRELESS COMMUNICATION METHOD, NETWORK DEVICE AND TERMINAL DEVICE

(71) Applicant: GUANGDONG OPPO MOBILE TELECOMMUNICATIONS CORP., LTD., Dongguan (CN)

(72) Inventor: Zhi Zhang, Dongguan (CN)

(73) Assignee: GUANGDONG OPPO MOBILE TELECOMMUNICATIONS CORP., LTD., Dongguan (CN)

(21) Appl. No.: 18/740,506

(22) Filed: Jun. 12, 2024

Related U.S. Patent Documents

Reissue of:
(64) Patent No.: 11,438,851
Issued: Sep. 6, 2022
Appl. No.: 17/153,859
Filed: Jan. 20, 2021

U.S. Applications:
(63) Continuation of application No. 16/845,835, filed on Apr. 10, 2020, now Pat. No. 10,932,209, which is a
(Continued)

(51) Int. Cl.
*H04W 56/00* (2009.01)
*H04J 11/00* (2006.01)
(Continued)

(52) U.S. Cl.
CPC ..... *H04W 56/0005* (2013.01); *H04J 11/0073* (2013.01); *H04J 11/0076* (2013.01);
(Continued)

(58) Field of Classification Search
CPC .... H04L 5/0048; H04L 5/0053; H04W 72/04; H04W 56/0005; H04W 56/0015;
(Continued)

(56) References Cited

U.S. PATENT DOCUMENTS 11,064,424 B2 * 7/2021 Zhang ..... H04L 27/26
2014/0334399 A1 11/2014 Xu et al.
(Continued)

FOREIGN PATENT DOCUMENTS

CN 103458529 A 12/2013
CN 110945925 A 3/2020
(Continued)

OTHER PUBLICATIONS

International Search Report in the international application No. PCT/CN2017/105777, mailed on Jun. 27, 2018. 5 pages with English translation.
(Continued)

*Primary Examiner* — Matthew E Heneghan
(74) *Attorney, Agent, or Firm* — ASHURST PERKINS COIE US LLP

(57) ABSTRACT

A method for wireless communication, a terminal device and a network device are provided. The method for wireless communication includes: a terminal device receives a Synchronization Signal Block (SSB), here, the SSB comprises Primary Synchronization Signal (PSS), Secondary Synchronization Signal (SSS), and Physical Broadcasting Channel (PBCH); here, the SSB comprises four consecutive symbols in time domain, which are symbol S0, symbol S1, symbol S2 and symbol S3 in sequence; and the PSS is transmitted on the symbol S0, the SSS is transmitted on the symbol S2, and the PBCH is transmitted on the symbol S1, the symbol S2 and the symbol S3.

20 Claims, 6 Drawing Sheets

Related U.S. Application Data continuation of application No. PCT/CN2017/105777, filed on Oct. 11, 2017.

(51) Int. Cl.
*H04L 5/00* (2006.01)
*H04W 48/12* (2009.01)
*H04W 72/04* (2023.01)

(52) U.S. Cl.
CPC ..... *H04J 11/0079* (2013.01); *H04L 5/0048* (2013.01); *H04L 5/0053* (2013.01); *H04W 48/12* (2013.01); *H04W 72/04* (2013.01); *H04W 56/0015* (2013.01)

(58) Field of Classification Search
CPC .. H04W 48/12; H04J 11/0076; H04J 11/0079; H04J 11/0073
See application file for complete search history.

(56) References Cited

U.S. PATENT DOCUMENTS

| | | | | |
|---|---|---|---|---|
| 2015/0049741 | A1 | 2/2015 | Chen | |
| 2015/0189541 | A1 | 7/2015 | Palanki et al. | |
| 2016/0056935 | A1 | 2/2016 | Damnjanovic et al. | |
| 2016/0142994 | A1 | 5/2016 | Luo et al. | |
| 2017/0064685 | A1 | 3/2017 | Rico Alvarino et al. | |
| 2017/0187563 | A1 | 6/2017 | Shin et al. | |
| 2017/0245165 | A1 | 8/2017 | Onggosanusi et al. | |
| 2018/0083755 | A1* | 3/2018 | Xue | H04L 5/0092 |
| 2018/0227867 | A1* | 8/2018 | Park | H04W 72/0466 |
| 2019/0037481 | A1 | 1/2019 | Zhang et al. | |
| 2019/0149383 | A1* | 5/2019 | Ko | H04W 72/042 370/329 |

FOREIGN PATENT DOCUMENTS

| | | | |
|---|---|---|---|
| EP | 3662715 | A1 | 6/2020 |
| EP | 3694283 | A1 | 8/2020 |
| JP | 2017503386 | A | 1/2017 |
| RU | 2540891 | C2 | 2/2015 |
| WO | 2017133676 | A1 | 8/2017 |
| WO | 2017164348 | A1 | 9/2017 |
| WO | 2019023241 | A1 | 1/2019 |

OTHER PUBLICATIONS

First Office Action of the Chinese application No. 202010065825.7, issued on Jul. 4, 2022. 15 pages with English translation.
European Search Report in the European application No. 22164171.5, mailed on Jul. 13, 2022. 8 pages.
Notice of Allowance of the U.S. Appl. No. 17/153,859, issued on Mar. 30, 2022. 16 pages.
Corrected Notice of Allowance of the U.S. Appl. No. 17/153,859, issued on Jun. 29, 2022. 4 pages.
Vivo, "Remaining issues on SS block and SS burst set composition", 3GPP TSG RAN WG1 Meeting #90, R1-1712822 Prague, Czech Rep, Aug. 21-25, 2017, the whole document. 3 pages.
ZTE, ZTE Microelectronics, "NR-SS: Bandwidth, Multiplexing", 3GPP TSG RAN WG1 AH_NR Meeting, R1-1700097, Spokane, USA Jan. 16-20, 2017, the whole document. 10 pages.
Ericsson, "Remaining details on synchronization signal design", 3GPP TSG RAN WG1 Meeting #90bis, R1-1718710, Prague, Czech Republic, Oct. 9-13, 2017, the whole document. 4 pages.
Huawei, HiSilicon, "Discussion and evaluation on NR-PBCH design", 3GPP TSG RAN WG1 NR Ad-Hoc meeting, R1-1710006, Qingdao, China Jun. 27-30, 2017, the whole document. 6 pages.
MCC Support, "Final Report of 3GPP TSG RAN WG1 #AH_NR2 v1.0.0 (Qingdao, China, Jun. 27-30, 2017)", 3GPP TSG RAN WG1 Meeting #90, R1-1712032, Prague, Czech Rep, Aug. 21-25, 2017, the whole document. 109 pages.
Vivo, "DMRS design for NR-PBCH", 3GPP TSG RAN WG1 Meeting #89, R1-1707228, Hangzhou, P.R. China May 15-19, 2017, the whole document. 16 pages.
Notice of Objection of the European application No. 17928710.7, issued on Oct. 27, 2022. 50 pages.
First Office Action of the Australian application No. 2017435587, issued on Jun. 6, 2023. 4 pages.
First Office Action of the Mexican application No. MX/a/2020/003826, issued on May 29, 2023. 5 pages with English translation.
First Office Action of the Vietnamese application No. 1-2020-02495, issued on Jun. 29, 2023. 3 pages with English translation.
Munich Trial Protocol, Apr. 27, 2023, the whole document. 10 pages with English translation.
Structure of claim 1, Jun. 19, 2023, the whole document. 1 page.
Brief of May 26, 2023 in parallel infringement proceedings, the whole document. 40 pages with English translation.
Datasheet for the decision of Jul. 12, 2018, T 1306/12, Boards of Appeal of the European Patent Office, the whole document. 17 pages.
Datasheet for the decision of Sep. 1, 2020, T 3142/19, Boards of Appeal of the European Patent Office, the whole document. 16 pages.
Overview of contents of [0068]-[0117] of A1 document, the whole document. 3 pages.
Oral Proceedings of the European application No. 17928710.7, issued on Aug. 23, 2023. 14 pages.
Supplementary European Search Report in the European application No. 23193789.7, mailed on Nov. 15, 2023. 8 pages.
First Office Action of the Korean application No. 10-2023-7008943, issued on Dec. 4, 2023. 10 pages with English translation.
Brief Communication of Letter from the opponent in the European application No. 17928710.7, mailed on Dec. 13, 2023. 12 pages.
Hearing Notice of the Indian application No. 202017016690, issued on Dec. 18, 2023. 2 pages with English translation.
Corrected Notice of Allowance of the U.S. Appl. No. 17/153,859, issued on Aug. 10, 2022. 4 pages.
Non Final Office Action of the U.S. Appl. No. 17/812,313, issued on Jan. 5, 2023. 30 pages.
Notice of Allowance of the U.S. Appl. No. 17/812,313, issued on Apr. 21, 2023. 11 pages.
Corrected Notice of Allowance of the U.S. Appl. No. 17/812,313, issued on Aug. 4, 2023. 5 pages.
Corrected Notice of Allowance of the U.S. Appl. No. 17/812,313, issued on Aug. 28, 2023. 5 pages.
Corrected Notice of Allowance of the U.S. Appl. No. 17/812,313, issued on Oct. 4, 2023. 5 pages.
Corrected Notice of Allowance of the U.S. Appl. No. 17/812,313, issued on Jan. 11, 2024. 4 pages.
Huawei et al, "Discussion and evaluation on broadcast channel/signals transmission for beam based initial access", 3GPP TSG RAN WG1 NR Ad Hoc Meeting R1-1700047, Spokane, USA, Jan. 16-20, 2017, pp. 1-8.
Samsung, "SS bandwidth and multiplexing in SS block", 3GPP TSG RAN WG1 Meeting #88 R1-1702900 Athens, Greece Feb. 13-17, 2017, pp. 1-6.
First Office Action of the Chinese application No. 201780092431.7, issued on Aug. 6, 2024. 27 pages with English translation.
First Office Action of the Japanese application No. 2023-106997, issued on Sep. 3, 2024. 8 pages with English translation.
First Office Action of the Australian application No. 2023278035, issued on Oct. 15, 2024. 3 pages.
First Office Action of the Brazilian application No. BR1120200070300, issued on Mar. 12, 2024. 8 pages with English translation.
Decision Revoking the European Patent of the European application No. 17928710.7, issued on Mar. 4, 2024. 130 pages.
First Office Action of the Vietnamese application No. 1-2024-00740, issued on Oct. 24, 2025.
First Office Action of the European application No. 23193789.7, issued on Dec. 11, 2025.
Office Action of the Indian application No. 202418002893, issued on Jun. 15, 2026, 7 pages with English translation.
Notice of Allowance of the European application No. 23193789.7, issued on Jun. 29, 2026, 36 pages.

(56) References Cited

OTHER PUBLICATIONS

First Office Action of the Taiwanese application No. 107134674, dated Oct. 28, 2021. 13 pages with English translation.
First Office Action of the Korean application No. 10-2020-7012952, dated Dec. 9, 2021. 11 pages with English translation.
First Office Action of the Canadian application No. 3078828, dated May 26, 2021.
Office Action of the Indian application No. 202017016690, dated Jun. 29, 2021.
First Office Action of the European application No. 17928710.7, dated Jul. 14, 2021.
Ericsson, Summary of 7.1.1 Remaining Details on Synchronization signal [online], 3GPP TSG RAN WG1 #90b R1-1719146, Internet<URL:http:/www.3gpp.org/ftp/tsg_ran/WG1_RL1/TSGR1_90b/Docs/R1-1719146.zip>, Oct. 13, 2017.
First Office Action of the Japanese application No. 2020-520267, dated Aug. 17, 2021.
Corrected Notice of Allowability dated Dec. 14, 2020 of U.S. Appl. No. 16/845,835, filed Apr. 10, 2020.
Ericsson; "Summary of 7.1.1 Remaining Details on Synchronization signal", TSG-RAN WG1 Meeting #90bis, R1-1718788 Prague, Czech Republic, Oct. 9-13, 2017, p. 2, section 3.
Intel Corporation. "On multiplexing between PSS and SSS" 3GPP TSG RAN WG1 Meeting #87, R1-1613046, Nov. 18, 2016 (Nov. 18, 2016).
International Search Report in the international application No. PCT/CN2017/105777, dated Jun. 27, 2018.
LG Electronics. "NR PBCH Design" 3GPP TSG RAN WG1 Meeting #87, R1-1611787, Nov. 18, 2016(Nov. 18, 2016).
Non-Final Office Action dated Jun. 5, 2020 of U.S. Appl. No. 16/845,835, filed Apr. 10, 2020.
Notice of Allowance dated Oct. 20, 2020 of U.S. Appl. No. 16/845,835, filed Apr. 10, 2020.
Notice of Allowance of the Russian application No. 2020115328, dated Dec. 14, 2020.
Qualcomm Incorporated; "Remaining details on synchronization signal design", 3GPP TSG RAN WG1 Meeting 90bis, R1-1718526 Prague, Oct. 9-13, 2017, p. 2, section 2.2.
Samsung; "Remaining details on synchronization signal", 3GPP TSG RAN WG1#90b, R1-1717576 Prague, Czech Republic, Oct. 9-13, 2017, p. 2, section 2.
Supplementary European Search Report in the European application No. 17928710.7, dated Nov. 4, 2020.
Written Opinion of the International Search Authority in the international application No. PCT/CN2017/105777, dated Jun. 27, 2018.
Vivo: "NR SS block and SS burst set design", 3GPP Draft; R1-1707226 NR SS Block and SS Burst Set Design. 3rd Generation Partnership Project (3GPP), Mobile Competence Centre; 650, Route Des Lucioles:F-06921 Sophia-Antipolis Cedex Rance vol. RAN WG1, No. Hangzhou; May 15, 2017-May 19, 2017 May 14, 2017 (May 14, 2017), XP051272439. * sections 2.1, 2.2 *.
3GPP "Physical channels and modulation (Release 15)" 3GPP Technical Specification 38.211 V1.0.0; Sep. 2017. 37 pages.
3GPP "Physical channels and modulation (Release 15)" 3GPP Technical Specification 38.211 V1.0.1; Sep. 2017. 46 pages.
Ericsson "Summary of email discussion [89-15] Details for NR-PBCH evaluation" R1-1709868; 3GPP TSG RAN WG1 Meeting #89; Hangzhou, China; May 15-19, 2017. 15 pages.
Notice of Submission of Opinion for Korean Application No. 10-2020-7012952 dated Jun. 15, 2022. 6 pages with English translation.
NTT Docomo, Inc. "Discussion on NR-PBCH design and SS block composition" R1-1711061; 3GPP TSG RAN WG1 NR Ad-Hoc#2; Qingdao, P.R. China; Jun. 27-30, 2017. 9 pages.
First Office Action of the Chinese application No. 202010065825.7, dated Jul. 4, 2022. 15 pages with English translation.
European Search Report in the European application No. 22164171.5, dated Jul. 13, 2022. 8 pages.

* cited by examiner

WIRELESS COMMUNICATION METHOD, NETWORK DEVICE AND TERMINAL DEVICE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

The application is a *reissue of U.S. Pat. No. 11,438,851 B2, which is issued from U.S. patent application Ser. No. 17/153,859 filed on Jan. 20, 2021, which is a* continuation [application] of U.S. patent application Ser. No. 16/845,835 filed on [Apr.] *Apr.* 10, 2020, *now issued as U.S. Pat. No. 10,932,209,* which is a continuation [application] of PCT Application No. PCT/CN2017/105777 filed on [Oct.] *Oct.* 11, 2017. The disclosures of [both] *the prior* applications are incorporated by reference herein in their [entity] *entirety*.

BACKGROUND

In a Long Term Evolution (LTE) system, signals for synchronization comprise a Primary Synchronization Signal (PSS) and a Secondary Synchronization Signal (SSS), and reference signals for Radio Resource Management (RRM) measurement of a terminal device comprise a Cell Reference Signal (CRS) or a Channel State Information Reference Signal (CSI-RS).

In a New Radio (NR) system, a network device may send multiple Synchronization Signal Blocks (SSBs) to a terminal device, and the terminal device may search a system bandwidth for the SSBs to acquire a cell Identifier (ID), perform time-frequency synchronization, acquire Physical Broadcasting Channel (PBCH) information, and perform RRM measurement on the basis of an SSS and a Demodulation Reference Signal (DMRS) for a PBCH.

In the NR system, a requirement on communication performance is high. Therefore, how to improve the communication performance in terms of SSB transmission is an urgent problem to be solved.

SUMMARY

The disclosure generally relates to the field of communications, and more particularly to a method for wireless communication, a network device and a terminal device.

In a first aspect, there is provided a method for wireless communication, which may include the following operations.

A terminal device receives a Synchronization Signal Block (SSB), here, the SSB comprises Primary Synchronization Signal (PSS), Secondary Synchronization Signal (SSS), and Physical Broadcasting Channel (PBCH).

Here, the SSB comprises four consecutive symbols in time domain, which are symbol S0, symbol S1, symbol S2 and symbol S3 in sequence; and the PSS is transmitted on the symbol S0, the SSS is transmitted on the symbol S2, and the PBCH is transmitted on the symbol S1, the symbol S2 and the symbol S3.

In a second aspect, there is provided a method for wireless communication, which may include the following operations.

A network device transmits a Synchronization Signal Block (SSB) to a terminal device, here, the SSB comprises Primary Synchronization Signal (PSS), Secondary Synchronization Signal (SSS), and Physical Broadcasting Channel (PBCH).

Here, the SSB comprises four consecutive symbols in time domain, which are symbol S0, symbol S1, symbol S2 and symbol S3 in sequence; and the PSS is transmitted on the symbol S0, the SSS is transmitted on the symbol S2, and the PBCH is transmitted on the symbol S1, the symbol S2 and the symbol S3.

In a third aspect, there is provided a terminal device, which may include a transceiver.

The transceiver is configured to receive a Synchronization Signal Block (SSB), here, the SSB comprises Primary Synchronization Signal (PSS), Secondary Synchronization Signal (SSS), and Physical Broadcasting Channel (PBCH).

Here, the SSB comprises four consecutive symbols in time domain, which are symbol S0, symbol S1, symbol S2 and symbol S3 in sequence; and the PSS is transmitted on the symbol S0, the SSS is transmitted on the symbol S2, and the PBCH is transmitted on the symbol S1, the symbol S2 and the symbol S3.

In a fourth aspect, there is provided a network device, which may include a transceiver.

The transceiver is configured to transmit a Synchronization Signal Block (SSB) to a terminal device, here, the SSB comprises Primary Synchronization Signal (PSS), Secondary Synchronization Signal (SSS), and Physical Broadcasting Channel (PBCH).

Here, the SSB comprises four consecutive symbols in time domain, which are symbol S0, symbol S1, symbol S2 and symbol S3 in sequence; and the PSS is transmitted on the symbol S0, the SSS is transmitted on the symbol S2, and the PBCH is transmitted on the symbol S1, the symbol S2 and the symbol S3.

BRIEF DESCRIPTION OF DRAWINGS

In order to describe the technical solutions of the embodiments of the disclosure more clearly, the drawings required to be used in descriptions about the embodiments or a related art will be simply introduced below. It is apparent that the drawings described below are only some embodiments of the disclosure. Other drawings may further be obtained by those of ordinary skill in the art according to these drawings without creative work.

DETAILED DESCRIPTION

The technical solutions in the embodiments of the disclosure will be described below in combination with the drawings in the embodiments of the disclosure. It is apparent that the described embodiments are not all embodiments but part of embodiments of the disclosure. All other embodiments obtained by those of ordinary skill in the art on the basis of the embodiments in the disclosure without creative work shall fall within the scope of protection of the disclosure.

The technical solutions of the embodiments of the disclosure may be applied to various communication systems, for example, a Global System of Mobile Communication (GSM), a Code Division Multiple Access (CDMA) system, a Wideband Code Division Multiple Access (WCDMA) system, a General Packet Radio Service (GPRS), an LTE system, an LTE Frequency Division Duplex (FDD) system, an LTE Time Division Duplex (TDD) system, a Universal Mobile Telecommunication System (UMTS), a Worldwide Interoperability for Microwave Access (WiMAX) communication system or a 5th-Generation (5G) system.

Figure 1:
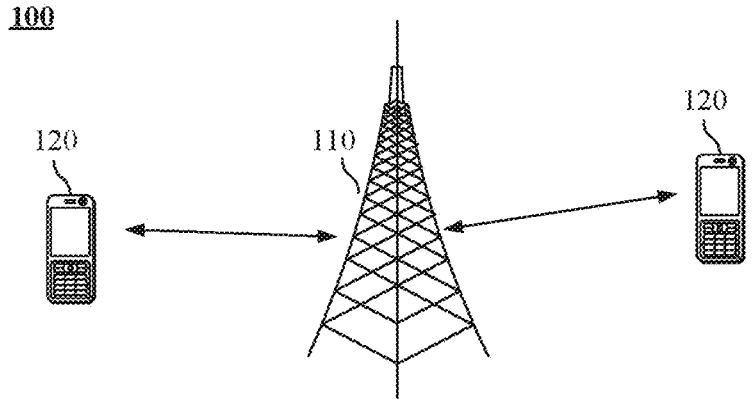
FIG. 1 is a diagram of a wireless communication system according to an embodiment of the disclosure.

FIG. 1 illustrates a wireless communication system 100 to which the embodiments of the disclosure are applied. The wireless communication system 100 may include a network device 110. The network device 110 may be a device communicating with a terminal device. The network device 110 may provide communication coverage for a specific geographical region and may communicate with a terminal device (for example, User Equipment (UE)) in the coverage. Optionally, the network device 110 may be a Base Transceiver Station (BTS) in the GSM or the CDMA system, may also be a NodeB (NB) in the WCDMA system, and may further be an Evolutional Node B (eNB or eNode B) in the LTE system or a wireless controller in a Cloud Radio Access Network (CRAN). Or the network device may be a relay station, an access point, a vehicle-mounted device, a wearable device, a network-side device in a 5G network, a network device in a future evolved Public Land Mobile Network (PLMN) or the like.

The wireless communication system 100 further includes at least one terminal device 120 within the coverage of the network device 110. The terminal device 120 may be mobile or fixed. Optionally, the terminal device 120 may be an access terminal, UE, a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a Personal Digital Assistant (PDA), a handheld device with a wireless communication function, a computing device, another processing device connected to a wireless modem, a vehicle-mounted device, a wearable device, a terminal device in the 5G network, a terminal device in the future evolved PLMN or the like.

Optionally, the Device to Device (D2D) communication may be performed between the terminal devices 120.

Optionally, the 5G system or network may also be called a New Radio (NR) system or network.

One network device and two terminal devices are exemplarily illustrated in FIG. 1. Optionally, the wireless communication system 100 may include multiple network devices and another number of terminal devices may be included in coverage of each network device. There are no limits made thereto in the embodiments of the disclosure.

Optionally, the wireless communication system 100 may further include another network entity such as a network controller and a mobility management entity. There are no limits made thereto in the embodiments of the disclosure.

Terms "system" and "network" in the disclosure may usually be exchanged in the disclosure. In the disclosure, term "and/or" is only an association relationship describing associated objects and represents that three relationships may exist. For example, A and/or B may represent three conditions: i.e., independent existence of A, existence of both A and B and independent existence of B. In addition, character "I" in the disclosure usually represents that previous and next associated objects form an "or" relationship.

Figure 2:
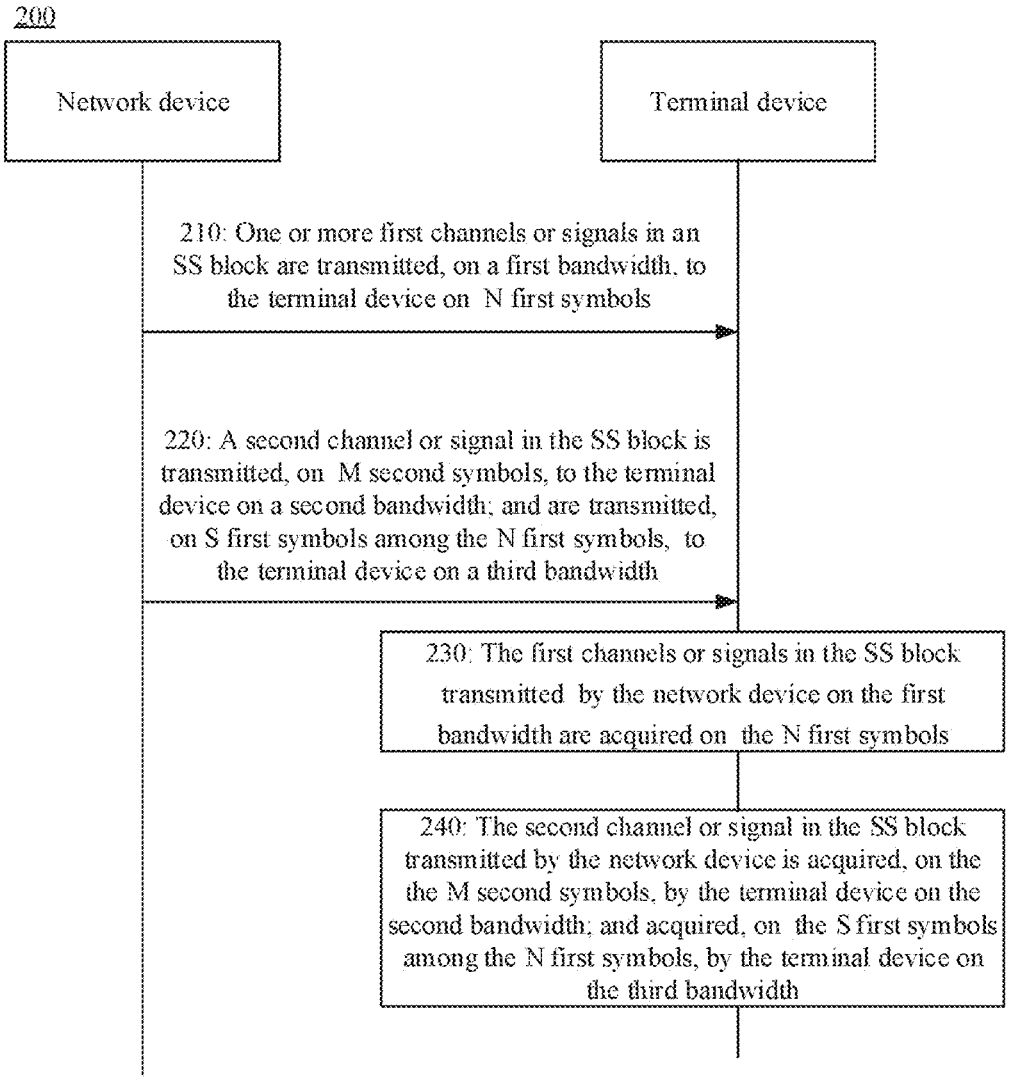
FIG. 2 is a flowchart of a method for wireless communication according to an embodiment of the disclosure.

FIG. 2 is a flowchart of a method 200 for wireless communication according to an embodiment of the disclosure. The method 200 may optionally be applied, but not limited, to the system illustrated in FIG. 1. The method 200 includes at least part of the following contents.

In 210, a network device transmits, on N first symbols, one or more first channels or signals in an SSB to a terminal device on a first bandwidth, here, N is an integer greater than or equal to 1.

Optionally, when N is greater than 1, the N first symbols may be N continuous symbols, or may also be N discontinuous symbols.

Optionally, the first channels or signals include at least one of a PSS or an SSS.

Optionally, the first channels or signals include a PSS and a SSS, and a first symbol occupied by the PSS is different from a first symbol occupied by the SSS occupy.

For example, the first channels or signals include the PSS and the SSS, N is equal to 2, one symbol is used to transmit the PSS, the other symbol is used to transmit the SSS, and the symbol occupied by transmission of the PSS may be spaced apart from the symbol occupied by transmission of the SSS by one symbol.

Optionally, frequency resources of the first bandwidth may be continuous frequency resources, and may also be discontinuous frequency resources.

Optionally, a first channel or signal may be a channel or signal that occupies, in a first symbol, the first bandwidth. The first channels or signals may include channels or signals with the same bandwidth characteristic, or include channels or signals of a type. A granularity of division of types may be determined according to a specific condition and will not be limited in the embodiment of the disclosure. For example, a first channel or signal is a Synchronization Signal (SS), or a first channel or signal is a PSS or an SSS.

Optionally, when N is greater than 1, a width of the first bandwidth occupied by transmission of the first channel or signal in any one of the N first symbols may be different from a width of the first bandwidth occupied by transmission of the first channel or signal in at least one other first symbol of the N first symbols; or a resource range of the first bandwidth occupied by transmission of the first channel or signal in any one of the first N symbols may be different from a resource range of the first bandwidth occupied by transmission of the first channel or signal in at least one other first symbol; or a width of the first bandwidth occupied by transmission of the first channel or signal in any one of the N first symbols may be different from a width of the first bandwidth occupied by transmission of the first channel or signal in at least one other first symbol and a resource range of the first bandwidth occupied by transmission of the first channel or signal in any one of the first N symbols may be different from a resource range of the first bandwidth occupied by transmission of the first channel or signal in at least one other first symbol.

For example, the first channels or signals include the PSS and the SSS, N is equal to 2, one symbol is used to transmit the PSS, and the other symbol is used to transmit the SSS. A bandwidth occupied by transmission of the PSS is different from a bandwidth occupied by transmission of the SSS; or a range of resources occupied by transmission of the PSS is different from a range of resources occupied by transmission of the SSS; or a bandwidth occupied by transmission of the PSS is different from a bandwidth occupied by transmission of the SSS and a range of resources occupied by transmission of the PSS are different from a range of resources occupied by transmission of the SSS.

Of course, a width of the first bandwidth occupied by transmission of the first channel or signal in each of the N first symbols may be the same; or a resource range of the first bandwidth occupied by transmission of the first channel or signal in each of the N first symbols may be the same; or a width of the first bandwidth occupied by transmission of the first channel or signal in each of the N first symbols may be the same and a resource range of the first bandwidth occupied by transmission of the first channel or signal in each of the N first symbols may be the same.

For example, the first channels or signals include the PSS and the SSS, N is equal to 2, one symbol is used to transmit the PSS, and the other symbol is used to transmit the SSS. A bandwidth occupied by transmission of the PSS is equal to a bandwidth occupied by transmission of the SSS; or a range of resources occupied by transmission of the PSS are as same as a range of resources occupied by transmission of the SSS; or a bandwidth occupied by transmission of the PSS is equal to a bandwidth occupied by transmission of the SSS and a range of resources occupied by transmission of the PSS are as same as a range of resources occupied by transmission of the SSS.

Optionally, the first bandwidth is equal to a bandwidth of an integer number of PRBs. For example, the first bandwidth is equal to a bandwidth of 12 PRBs. Of course, it may also be another numerical value, for example, a bandwidth of 10 or 14 PRBs.

Optionally, in the embodiment of the disclosure, the first bandwidth occupied by transmission of the first channel or signal may include guard subcarrier spacings on two sides.

In 220, the network device transmits, on M second symbols, a second channel or signal in the SSB to the terminal device on a second bandwidth; and transmit, on S first symbols among the N first symbols, the second channel or signal to the terminal device on a third bandwidth, here, a range of frequency resources of the first bandwidth has no overlap with a range of frequency resources of the third bandwidth, and M and S are both integers greater than or equal to 1.

Optionally, the N first symbols are alternately arranged with the M second symbols.

For example, N is equal to 2 and M is equal to 2. The N first symbols and the M second symbols are sequenced in a time domain by an order of: one of the first symbols, one of the second symbols, another one of the first symbols and another one of the second symbols.

Optionally, when M is greater than 1, the M second symbols may be M continuous symbols, and may also be M discontinuous symbols.

Optionally, the second channel or signal includes PBCH. Optionally, the PBCH mentioned in the embodiment of the disclosure may include a DMRS for the PBCH.

Optionally, the first channels or signals include the PSS but no SSS, which means that the PBCH may be transmitted in the symbol in which the PSS is only transmitted and no PBCH is transmitted in the symbol in which the SSS is transmitted.

Or, the first channels or signals include the SSS but no PSS, which means that the PBCH may be transmitted in the symbol in which the SSS is only transmitted and no PBCH is transmitted in the symbol in which the PSS is transmitted.

Or, the first channels or signals include the PSS and the SSS, which means that the PBCH may be transmitted in the symbol in which the PSS is transmitted and in the symbol in which the SSS is transmitted.

In the embodiment of the disclosure, descriptions are made in many places with the situation that the first channels or signals include at least one of the PSS or the SSS and the second channel or signal includes the PBCH as an example, but are not intended to limit the embodiment of the disclosure.

For example, the first channels or signals include a PSS and the second channel or signal includes an SSS; or, the first channels or signals include an SSS and the second channel or signal includes a PSS; or, the first channels or signals include a PBCH and the second channel or signal includes at least one of a PSS or an SSS.

Optionally, frequency resources of the second bandwidth may be continuous frequency resources, and may also be discontinuous frequency resources.

Optionally, the second channel or signal may include a channel or signal that occupies, in a second symbol, the second bandwidth and a channel or signal that occupies, in a first symbol, the third bandwidth. The second channel or signal may include channels or signals with the same bandwidth characteristic, or include channels or signals of a type. A granularity of division of types may be determined according to a specific condition and will not be limited in the embodiment of the disclosure.

Optionally, when M is greater than 1, a width of the second bandwidth occupied by transmission of the second channel or signal in any one of the M second symbols may be different from a width of the second bandwidth occupied by transmission of the second channel or signal in at least one other second symbol of the M second symbols; or a resource range of the second bandwidth occupied by transmission of the second channel or signal in any one of the M second symbols may be different from a resource range of the second bandwidth occupied by transmission of the second channel or signal in at least one other second symbol; or a width of the second bandwidth occupied by transmission of the second channel or signal in any one of the M second symbols may be different from a width of the second bandwidth occupied by transmission of the second channel or signal in at least one other second symbol and a resource range of the second bandwidth occupied by transmission of the second channel or signal in any one of the M second symbols may be different from a resource range of the second bandwidth occupied by transmission of the second channel or signal in at least one other second symbol.

Of course, a width of the second bandwidth occupied by transmission of the second channel or signal in each of the M second symbols may be the same; or a resource range of the second bandwidth occupied by transmission of the second channel or signal in each of the M second symbols may the same; or a width of the second bandwidth occupied by transmission of the second channel or signal in each of the M second symbols may be the same and a resource range of the second bandwidth occupied by transmission of the second channel or signal in each of the M second symbols may the same.

Optionally, when S is greater than 1, a width of the third bandwidth occupied by transmission of the second channel or signal in any one of the S first symbols may be different from a width of the third bandwidth occupied by transmission of the second channel or signal in at least one other first symbol of the S first symbols; or a resource range of the third bandwidth occupied by transmission of the second channel or signal in any one of the S first symbols may be different from a resource range of the third bandwidth occupied by transmission of the second channel or signal in at least one other first symbol; or a width of the third bandwidth occupied by transmission of the second channel or signal in any one of the S first symbols may be different from a width of the third bandwidth occupied by transmission of the second channel or signal in at least one other first symbol and a resource range of the third bandwidth occupied by transmission of the second channel or signal in any one of the S first symbols may be different from a resource range of the third bandwidth occupied by transmission of the second channel or signal in at least one other first symbol.

Of course, a width of the third bandwidth occupied by transmission of the second channel or signal in each of the S first symbols may be the same; or a resource range of the third bandwidth occupied by transmission of the second channel or signal in each of the S first symbols may be the same; or a width of the third bandwidth occupied by transmission of the second channel or signal in each of the S first symbols may be the same and a resource range of the third bandwidth occupied by transmission of the second channel or signal in each of the S first symbols may be the same.

Optionally, S is less than or equal to N.

If the first channels or signals include the PSS and the SSS, the second channel or signal include the PBCH and N is equal to 2, then S is less than N which means that only the symbol occupied by the PSS or the SSS is used to transmit the PBCH.

Optionally, the second bandwidth is equal to a bandwidth of an integer number of PRBs.

Optionally, the second bandwidth is less than a bandwidth of 24 PRBs, for example, equal to a bandwidth of 18 PRBs, and of course, may also be another numerical value, for example, equal to a bandwidth of 20 PRBs or 16 PRBs, etc.

Optionally, the third bandwidth is equal to a bandwidth of an integer number of PRBs.

Optionally, the third bandwidth is equal to a bandwidth of 6 PRBs, and of course, may also be another numerical value, for example, equal to a bandwidth of 5 PRBs or 4 PRBs, etc.

Optionally, in the embodiment of the disclosure, the second bandwidth occupied by transmission of the second channel or signal may include guard subcarrier spacings on two sides.

Optionally, in the embodiment of the disclosure, the third bandwidth occupied by transmission of the second channel or signal may include guard subcarrier spacings on two sides.

In 230, the terminal device acquires, on the N first symbols, the first channels or signals in the SSB that is transmitted by the network device on the first bandwidth.

Specifically, the terminal device may perform blind detection in the N first symbols to acquire the first channels or signals, for example, the PSS and the SSS, transmitted by the network device over the first bandwidth.

In 240, the terminal device acquires, on the M second symbols, the second channel or signal in the SSB from the network device on the second bandwidth; and acquires, on the S second symbols among the N first symbols, the second channel or signal on the third bandwidth.

Therefore, the terminal device, after acquiring the first channels or signals and the second channel or signal, may acquire a cell ID, perform time-frequency synchronization, acquire PBCH information or perform RRM measurement on the basis of the SSS and the DMRS for the PBCH, etc.

Optionally, the network device may send multiple SSBs, and the multiple SSBs may form an SS burst set. Each of the multiple SSBs may be transmitted through a respective one of multiple transmission beams, and a transmission beam for any one of the SSBs is different from transmission beams for any other SSB.

Optionally, a sum of the first bandwidth and the third bandwidth is equal to or less than the second bandwidth.

For example, if the second bandwidth is X and the first bandwidth is Y, the third bandwidth may be less than or equal to X-Y. That is, the bandwidth on which the first channels or signals are transmitted in each of the N first symbols is Y, the bandwidth on which the second channel or signal is transmitted in each of the S symbols of the N first symbols is less than or equal to X-Y, and the bandwidth on which the second channel or signal is transmitted in each of the second symbols is X.

When S is less than N, the remaining/unoccupied bandwidth X-Y on the other symbols of the N first symbols except the S first symbols may be used to transmit a channel or signal except the first channels or signals and the second channel or signal, or may also be used to transmit no channel or signal.

Optionally, the range of the frequency resources of the first bandwidth is a subset of the range of frequency resources of the second bandwidth, and the range of the frequency resources of the third bandwidth is a subset of the range of the frequency resources of the second bandwidth. In such case, optionally, a center frequency point of the second bandwidth may be called a center frequency point of the SSB.

The range of the frequency resources of the first bandwidth may be equal to the range of frequency resources of the second bandwidth, and the range of the frequency resources of the third bandwidth may be equal to the range of the frequency resources of the second bandwidth. Or the range of the frequency resources of the first bandwidth may be a subset of the range of the frequency resources of the second bandwidth and the range of the frequency resources of the third bandwidth may be a subset of the range of the frequency resources of the second bandwidth.

Optionally, a center frequency point of the first bandwidth is equal to the center frequency point of the second bandwidth. In such case, the range of the frequency resources of the third bandwidth may be located on both sides of the range of the frequency resources of the first bandwidth. In such case, optionally, the sum of the first bandwidth and the third bandwidth is equal to or less than the second bandwidth.

For example, if the first channels or signals include the PSS and the SSS, the second channel or signal includes the PBCH, the second bandwidth is X and the first bandwidth is Y. In the SSB, a bandwidth $(X-Y)/2$ is not occupied on each of the two sides of the symbols in which the PSS and the SSS are transmitted. In addition to the symbols in which only the PBCH is transmitted, the unoccupied bandwidths on the two sides of the symbol for the PSS/SSS may be used to transmit the PBCH.

Figure 3:
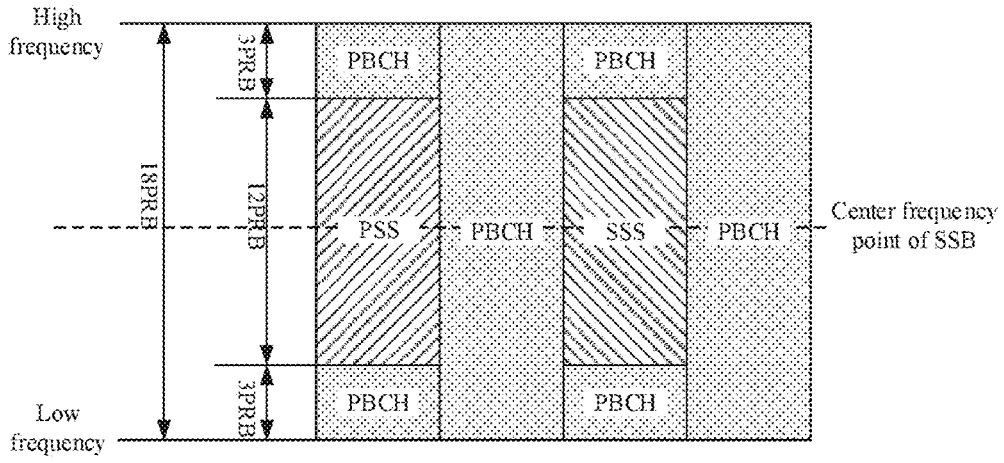
FIG. 3 is a diagram of an SSB transmission scheme according to an embodiment of the disclosure.

For example, as illustrated in FIG. 3, in the SSB, a bandwidth for PBCH in the symbol in which only the PBCH is transmitted includes 18 PRBs, the bandwidth occupied by each of the PSS and the SSS include 12 PRBs and a center frequency point of the 12 PRBs occupied by each of the PSS and the SSS is a center frequency point of the SSB, so that three PRBs are remained on each of the two sides of the PSS, and three PRBs are remained on each of the two sides of the SSS. These remained PRBs may be used to transmit the PBCH.

When the center frequency point of the first bandwidth is equal to the center frequency point of the second bandwidth, the range of the frequency resources of the third bandwidth may also be located on one side of the range of the frequency resources of the first bandwidth and, a channel or signal except the first channels or signals and the second channel or signal may be transmitted on the other side of the range of the frequency resources of the first bandwidth, or no channel or signal may be transmitted on the other side of the range of the frequency resources of the first bandwidth.

Optionally, the range of the frequency resources of the third bandwidth is within a low-frequency range of the second bandwidth; and the range of the frequency resources of the first bandwidth is within a high-frequency range of the second bandwidth. In such case, a frequency range of the third bandwidth is lower than a frequency range of the first bandwidth.

In such case, optionally, the lowest position of the frequency resources of the third bandwidth may be equal to the lowest position of the frequency resources of the second bandwidth, and the highest position of the frequency resources of the first bandwidth may be equal to the highest position of the frequency resources of the second bandwidth.

For example, if the first channels or signals include the PSS and the SSS, the second channel or signal includes the PBCH, the second bandwidth is X and the first bandwidth is Y. In the SSB, a bandwidth (X-Y) is remained on one side of the symbols in which the PSS and the SSS are transmitted. In addition to the symbols in which only the PBCH is transmitted, the remained bandwidth on the one side of the symbols in which the PSS and SSS are transmitted may be used to transmit the PBCH.

Figure 4:
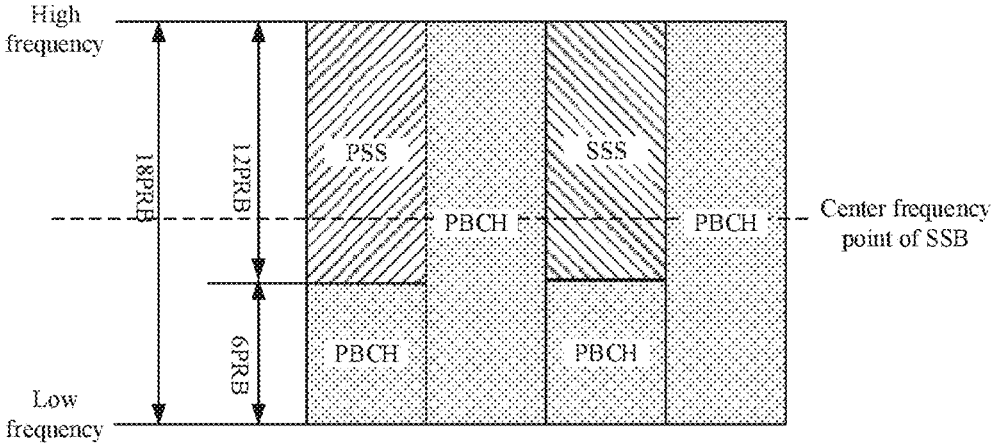
FIG. 4 is a diagram of an SSB transmission scheme according to an embodiment of the disclosure.

As illustrated in FIG. 4, in the SSB, a bandwidth for PBCH in the symbol in which only the PBCH is transmitted includes 18 PRBs, the bandwidth occupied by the PSS/SSS includes 12 PRBs (including guard subcarriers on the two sides of the PSS and the SSS) and the 12 PRBs, that are occupied by each of the PSS and the SSS in the symbols in which the PSS and the SSS are transmitted, are within a high-frequency range of the SSB, so that six PRBs are remained within a low-frequency range of the SSB. These remained PRBs are used to transmit the PBCH(s).

Optionally, the range of the frequency resources of the first bandwidth is within a low-frequency range of the second bandwidth; and the range of the frequency resources of the third bandwidth is within a high-frequency range of the second bandwidth.

For example, if the first channels or signals include the PSS and the SSS, the second channel or signal includes the PBCH, the second bandwidth is X and the first bandwidth is Y. In the SSB, the bandwidth (X-Y) is not occupied on one side of the symbols in which the PSS and the SSS are transmitted. In addition to the symbols in which only the PBCH is transmitted, the unoccupied bandwidths on the one side of the symbols in which the PSS and SSS are transmitted may be used to transmit the PBCH.

Figure 5:
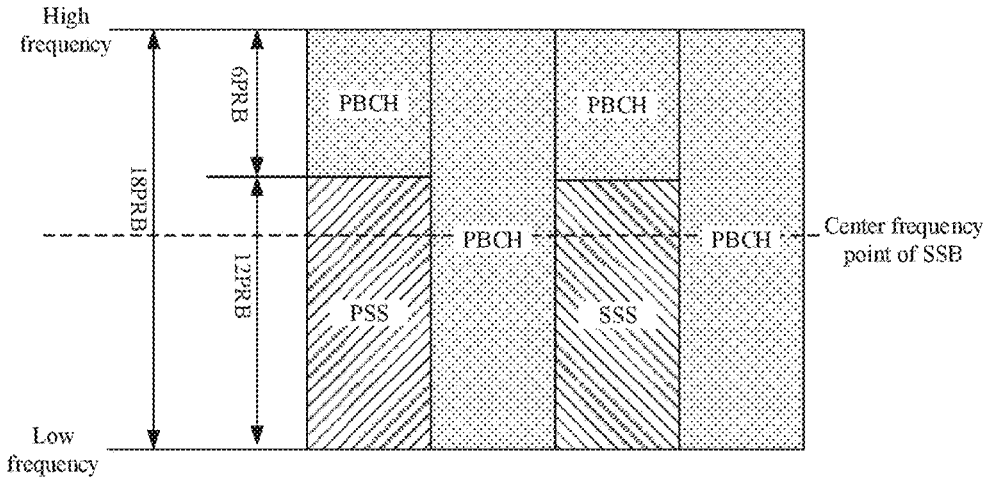
FIG. 5 is a diagram of an SSB transmission scheme according to an embodiment of the disclosure.

As illustrated in FIG. 5, in the SSB, a bandwidth for PBCH in the symbol in which only the PBCH is transmitted includes 18 PRBs, the bandwidth occupied by the PSS/SSS includes 12 PRBs (including the guard subcarriers on the two sides of the PSS and the SSS) and the 12 PRBs, that are occupied by each of the PSS and the SSS in the symbols in which the PSS and the SSS are transmitted, are within the low-frequency range of the SSB, so that six PRBs are remained within the high-frequency range of the SSB. These remained PRBs are used to transmit the PBCH.

Optionally, the network device performs, in an order of first frequency and then time, mapping of the second channel or signal, here, the mapping starts from a starting symbol among the N first symbols and the M second symbols, here, the mapping is performed in sequential order of the N first symbols and the M second symbols in the time domain, and the mapping is performed from low-frequency resource to high-frequency resource. Here, a bandwidth mapped on the first symbol is the third bandwidth and a bandwidth mapped on the second symbol is the second bandwidth. The network device transmits a mapped second channel or signal to the terminal device. Correspondingly, the terminal device performs, in the order of the first frequency and then time, de-mapping of the second channel or signal, here, the de-mapping starts from the starting symbol among the N first symbols and the M second symbols, here, the de-mapping is performed in sequential order of the N first symbols and the M second symbols in the time domain, and the de-mapping is performed from the low-frequency resource to the high-frequency resource. Herein, a bandwidth de-mapped on the first symbol is the third bandwidth and a bandwidth de-mapped on the second symbol is the second bandwidth.

Figure 6:
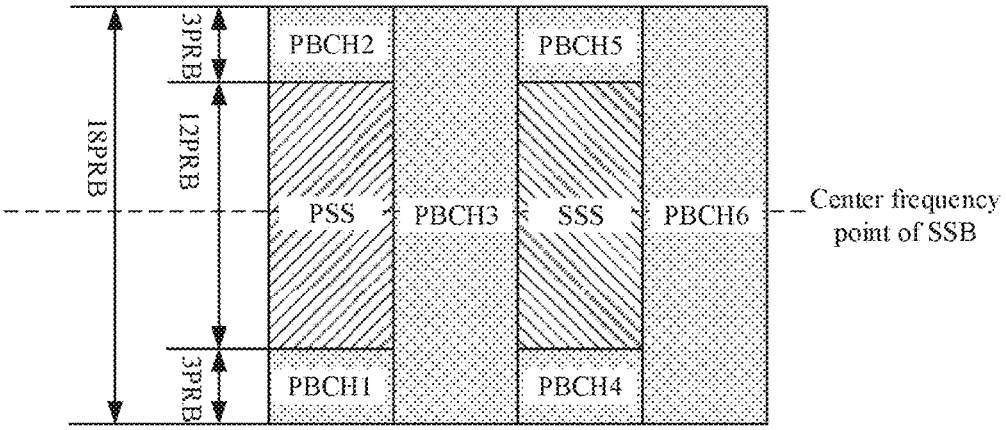
FIG. 6 is a diagram of an SSB transmission scheme according to an embodiment of the disclosure.

For example, as illustrated in FIG. 6, PBCH mapping is performed on a frequency band in which PBCH(s) may be transmitted, in an order of frequency first and then time.

For example, in FIG. 6, the PBCH(s) may be mapped in an order of first frequency and then time (i.e., starting from the starting symbol; in the starting symbol, mapping is performed first on a low-frequency bandwidth and then on a high-frequency bandwidth; and then the same operations are performed in subsequent symbols in turn). That is, mapping is performed in an order of: PBCH1-PBCH2-PBCH3-PBCH4-PBCH5-PBCH6 in FIG. 6, and the mapping is also performed in each of the bandwidths in an order of from low frequency points to high frequency points.

In the embodiment of the disclosure, mapping may also be performed in an order of first time and then frequency. Or, when mapping is performed in the frequency, the mapping may also be performed in an order of first high-frequency and then low-frequency.

When the terminal device performs cell search on a frequency band, a value of a synchronization channel raster for cell search is related to a bandwidth of the terminal, and is also related to a bandwidth occupied by the SSB. If the bandwidth occupied by the SSB is larger, the value of the synchronization channel raster for cell search is smaller.

In such a manner, in the embodiment of the disclosure, the second channel or signal may be transmitted in the symbols in which the first channels or signals are transmitted, and an overall bandwidth occupied by the SSB may be reduced, so that the number of times of initial searches is reduced without greatly reducing transmission resources for the second channel or signal. Therefore, influence of reduction in the bandwidth of the SSB on transmission performance of the second channel or signal is reduced or avoided, and communication performance may be improved.

Figure 7:
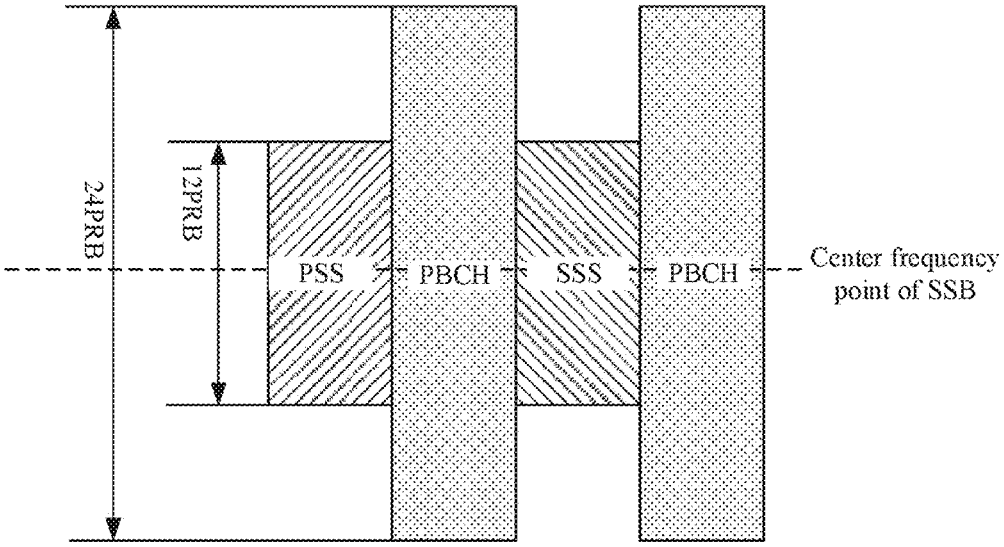
FIG. 7 is a diagram of an SSB transmission scheme.

For example, there is made such a hypothesis that the first channels or signals include the PSS and the SSS, the second channel or signal includes the PBCH, a sequence length of each of the PSS and the SSS is 127, and thus 127 Resource Elements (REs) in 12 PRBs are needed to be occupied. The PBCH is needed to occupy 288 REs in 24 PRBs. As illustrated in FIG. 7, if the PSS is transmitted in the first symbol and the SSS is transmitted in the third symbol and the PBCH is transmitted in the second and fourth symbols only, then the bandwidth occupied by the SSB is a bandwidth occupied by 24 PRBs. As illustrated in FIG. 3-6, if six PRBs in the first and third symbols are occupied to transmit the PBCH, then the bandwidth of the SSB includes 18 PRBs. Therefore, a reduction of resources occupied by the PBCH may be avoided on the basis of reducing the bandwidth of the SSB, and the communication performance may be improved.

The above descriptions are made with the situation that the first channels or signals and the second channel or signal are channels or signals in the SSB as an example but not intended to limit the embodiment of the disclosure. The first channels or signals and the second channel or signal may also not be channels or signals in the SSB. For example, the first channels or signals include a Physical Downlink Control Channel (PDCCH), and the second channel or signal include a Physical Downlink Shared Channel (PDSCH). Or, the first channels or signals and the second channel or signal may be other channels or signals.

Figure 8:
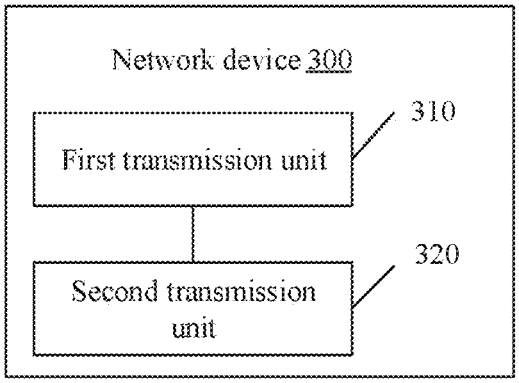
FIG. 8 is a block diagram of a network device according to an embodiment of the disclosure.

FIG. 8 is a block diagram of a network device 300 according to an embodiment of the disclosure. As illustrated in FIG. 8, the network device 300 includes a first transmission unit 310 and a second transmission unit 320. The first transmission unit 310 is configured to transmit, on N first symbols, one or more first channels or signals in an SSB to a terminal device on a first bandwidth, here, N is an integer greater than or equal to 1. The second transmission unit 320 is configured to transmit, on M second symbols, a second channel or signal in the SSB to the terminal device on a second bandwidth; and transmit, on S first symbols of the N first symbols, the second channel or signal to the terminal device on a third bandwidth, here, a range of frequency resources of the first bandwidth has no overlap with a range of frequency resources of the third bandwidth and M and S are each an integer greater than or equal to 1.

The network device 300 may correspond to the network device in the method 200, may implement corresponding operations implemented by the network device in the method 200 and, for simplicity, will not be elaborated herein.

Figure 9:
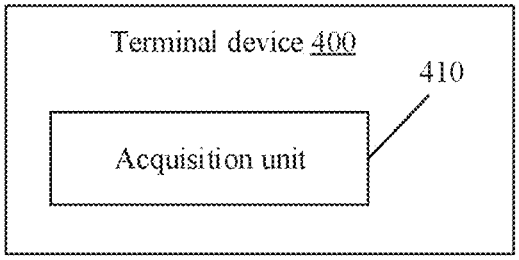
FIG. 9 is a block diagram of a terminal device according to an embodiment of the disclosure.

FIG. 9 is a block diagram of a terminal device 400 according to an embodiment of the disclosure. As illustrated in FIG. 9, the terminal device 400 includes an acquisition unit 410. The acquisition unit 410 is configured to acquire, on M second symbols, a second channel or signal in an SSB from a network device on a second bandwidth; and acquire, on S first symbols of N first symbols, the second channel or signal on a third bandwidth. Herein, one or more first channels or signals in the SSB are transmitted, on a first bandwidth, by the network device on the N first symbols. A range of frequency resources of the third bandwidth has no overlap with a range of frequency resources of the first bandwidth, and M, N and S are each an integer greater than or equal to 1.

Optionally, the acquisition unit 410 may further execute the operation in 230 to acquire the first channel or signal.

The terminal device 400 may correspond to the terminal device in the method 200, may implement corresponding operations implemented by the terminal device in the method 200 and, for simplicity, will not be elaborated herein.

Figure 10:
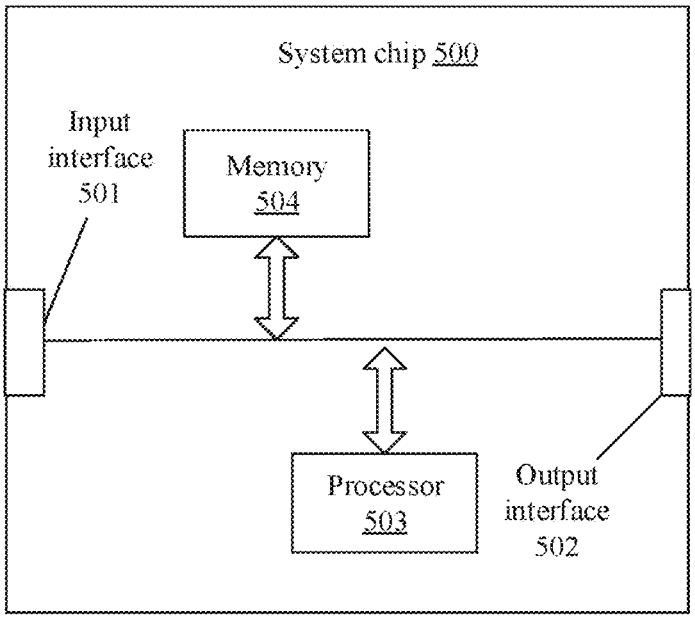
FIG. 10 is a block diagram of a system chip according to an embodiment of the disclosure.

FIG. 10 is a structure diagram of a system chip 500 according to an embodiment of the disclosure. The system chip 500 of FIG. 10 includes an input interface 501, output interface 502, processor 503 and memory 504 which may be connected through an internal communication connection line. The processor 503 is configured to execute a code in the memory 504.

Optionally, when the code is executed, the processor 503 implements the method executed by the network device in the method embodiments. For simplicity, no more elaborations will be made herein.

Optionally, when the code is executed, the processor 503 implements the method executed by the terminal device in the method embodiments. For simplicity, no more elaborations will be made herein.

Figure 11:
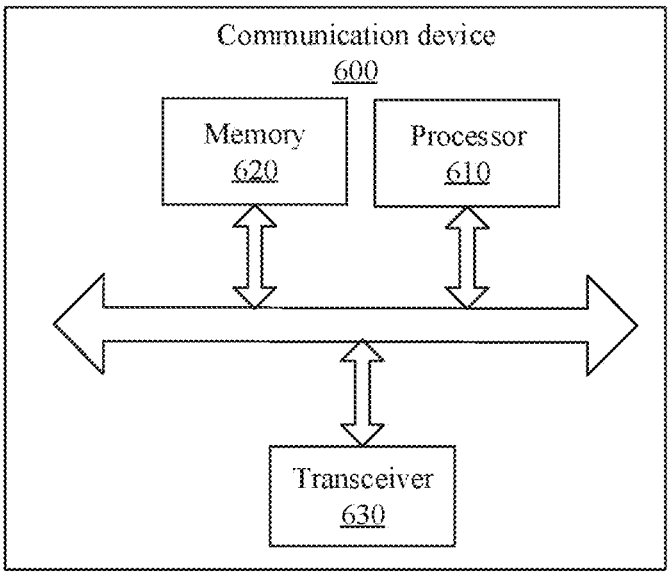
FIG. 11 is a block diagram of a communication device according to an embodiment of the disclosure.

FIG. 11 is a block diagram of a communication device 600 according to an embodiment of the disclosure. As illustrated in FIG. 11, the communication device 600 includes a processor 610 and a memory 620. Herein, the memory 620 may store a program code, and the processor 610 may execute the program code stored in the memory 620.

Optionally, as illustrated in FIG. 11, the communication device 600 may include a transceiver 630, and the processor 610 may control the transceiver 630 for external communication.

Optionally, the processor 610 may call the program code stored in the memory 620 to execute corresponding operations of the network device in the method embodiments. For similarity, elaborations will be omitted herein.

Optionally, the processor 610 may call the program code stored in the memory 620 to execute corresponding operations of the terminal device in the method embodiments. For similarity, elaborations will be omitted herein.

The processor in the embodiment of the disclosure may be an integrated circuit chip and has a signal processing capability. In an implementation process, each operation of the method embodiments may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, operation and logical block diagram disclosed in the embodiments of the disclosure may be implemented or executed. The universal processor may be a microprocessor or the processor may also be any conventional processor and the like. The operations of the method disclosed in combination with the embodiments of the disclosure may be directly embodied to be executed and completed by a hardware decoding processor or executed and completed by a combination of hardware and software modules in the decoding processor. The software module may be located in a mature storage medium in the field such as a Random Access Memory (RAM), a flash memory, a Read-Only Memory (ROM), a Programmable ROM (PROM) or Electrically Erasable PROM (EEPROM) and a register. The storage medium is located in a memory, and the processor reads information in the memory and completes the operations of the methods in combination with hardware.

The memory in the embodiment of the disclosure may be a volatile memory or a nonvolatile memory, or may include both the volatile and nonvolatile memories. The nonvolatile memory may be a ROM, a PROM, an Erasable PROM (EPROM), an EEPROM or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DR RAM). The memory of a system and method described in the disclosure is intended to include, but not limited to, memories of these and any other proper types.

Those of ordinary skill in the art may realize that the units and algorithm operations of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the disclosure.

Those skilled in the art may clearly learn about that specific working process of the system, device and unit described above may refer to the corresponding processes in the method embodiments and will not be elaborated herein for convenient and brief description.

In some embodiments provided by the disclosure, the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected according to a practical requirement to achieve the purpose of the solutions of the embodiments.

In addition, each functional unit in each embodiment of the disclosure may be integrated into a processing unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the disclosure substantially or parts making contributions to the related art or part of the technical solutions may be embodied in form of software product, and the computer software product is stored in a storage medium and includes multiple instructions configured to enable a computer device (which may be a personal computer, a server, a network device or the like) to execute all or part of the operations of the method in each embodiment of the disclosure. The abovementioned storage medium includes: various media capable of storing program codes, such as a U disk, a mobile hard disk, a ROM, a RAM, a magnetic disk or an optical disk.

The above is only the specific implementation mode of the disclosure and not intended to limit the scope of protection of the disclosure. Any variations or replacements apparent to those skilled in the art within the technical scope disclosed in the disclosure shall fall within the scope of protection of the disclosure. Therefore, the scope of protection of the disclosure shall be subject to the scope of protection of the claims.

The invention claimed is:

1. A method for wireless communication, comprising:

[receiving] *acquiring*, by a terminal device *on N first symbols, one or more first channels or signals on a first bandwidth, wherein N equals 2, the first channels or signals belong to* a Synchronization Signal Block (SSB)[, the SSB comprising] *transmitted by a network device and comprise a* Primary Synchronization Signal (PSS)[,] *and a* Secondary Synchronization Signal (SSS), [and Physical Broadcasting Channel (PBCH)] *one symbol of the two first symbols is used to transmit the PSS, and the other symbol of the two first symbols is used to transmit the SSS; and*

*acquiring, by the terminal device on M second symbols, a second channel or signal in the SSB on a second bandwidth; and acquiring, by the terminal device on S first symbols among the N first symbols, the second channel or signal on a third bandwidth,* wherein *M equals 2 and S equals 1, the second channel or signal comprises a Physical Broadcasting Channel (PBCH), a range of frequency resources of the first bandwidth does not overlap with a range of frequency resources of the third bandwidth, and the two first symbols and the two second symbols are sequenced in a time domain by an order of: one of the first symbols, one of the second symbols, another one of the first symbols and another one of the second symbols,* [the SSB comprises four consecutive symbols in time domain, which are symbol S0, symbol S1, symbol S2 and symbol S3 in sequence; and the PSS is transmitted on the symbol S0, the SSS is transmitted on the symbol S2, and the PBCH is transmitted on the symbol S1, the symbol S2 and the symbol S3, wherein a frequency range of the PSS is a first bandwidth and a frequency range of the SSS is the first bandwidth;

wherein a frequency range of the PBCH transmitted on the symbol S1 is a second bandwidth, a frequency range of the PBCH transmitted on the symbol S3 is the second bandwidth, and a frequency range of the PBCH transmitted on the symbol S2 is a third bandwidth; and]

*wherein the range of the frequency resources of the first bandwidth is a subset of a range of frequency resources of the second bandwidth, and the range of the frequency resources of the third bandwidth is a subset of the range of the frequency resources of the second bandwidth, and* wherein the second bandwidth is less than a [frequency range] *bandwidth* of 24 Physical Resource Blocks (PRBs).

[2. The method of claim 1, wherein the third bandwidth has no overlap with the first bandwidth.]

[3. The method of claim 2, wherein the first bandwidth is a subset of the second bandwidth and the third bandwidth is a subset of the second bandwidth.]

4. The method of claim 1, wherein *the range of the frequency resources of* the third bandwidth [comprises a first sub-bandwidth and a second sub-bandwidth, and the first sub-bandwidth is spaced apart from the second sub-bandwidth;

wherein] *is on both sides of the range of the frequency resources of* the first bandwidth[is between the first sub-bandwidth and the second sub-bandwidth].

[5. The method of claim 4, wherein a highest frequency of the first sub-bandwidth is equal to a highest frequency of the second bandwidth and a lowest frequency of the second sub-bandwidth is equal to a lowest frequency of the second bandwidth.]

6. A method for wireless communication, comprising:

transmitting, by a network device *on N first symbols, one or more first channels or signals in* a Synchronization Signal Block (SSB) to a terminal device *on a first bandwidth, wherein N equals 2, the first channels or signals comprise a* [the SSB comprising] Primary Synchronization Signal (PSS)[,] *and a* Secondary Synchronization Signal (SSS), [and Physical Broadcasting Channel (PBCH)] *one symbol of the two first symbols is used to transmit the PSS, and the other symbol of the two first symbols is used to transmit the SSS; and*

*transmitting, by the network device on M second symbols, a second channel or signal in the SSB to the terminal device on a second bandwidth and transmitting, by the network device on S first symbols among the N first symbols, the second channel or signal to the terminal device on a third bandwidth,* wherein *M equals 2 and S equals 1, the second channel or signal comprises a Physical Broadcasting Channel (PBCH), a range of frequency resources of the first bandwidth does not overlap with a range of frequency resources of the third bandwidth, and the two first symbols and the two second symbols are sequenced in a time domain by an order of: one of the first symbols, one of the second symbols, another one of the first symbols and another one of the second symbols,* [the SSB comprises four consecutive symbols in time domain, which are symbol S0, symbol S1, symbol S2 and symbol S3 in sequence; and the PSS is transmitted on the symbol S0, the SSS is transmitted on the symbol S2, and the PBCH is transmitted on the symbol S1, the symbol S2 and the symbol S3, wherein a frequency range of the PSS is a first bandwidth and a frequency range of the SSS is the first bandwidth;

wherein a frequency range of the PBCH transmitted on the symbol S1 is a second bandwidth, a frequency range of the PBCH transmitted on the symbol S3 is the second bandwidth, and a frequency range of the PBCH transmitted on the symbol S2 is a third bandwidth; and]

*wherein the range of the frequency resources of the first bandwidth is a subset of a range of frequency resources of the second bandwidth, and the range of the frequency resources of the third bandwidth is a subset of the range of the frequency resources of the second bandwidth, and* wherein the second bandwidth is less than a [frequency range] *bandwidth* of 24 Physical Resource Blocks (PRBs).

[7. The method of claim 6, wherein the third bandwidth has no overlap with the first bandwidth.]

[8. The method of claim 7, wherein the first bandwidth is a subset of the second bandwidth and the third bandwidth is a subset of the second bandwidth.]

9. The method of claim 6, wherein *the range of the frequency resources of* the third bandwidth [comprises a first sub-bandwidth and a second sub-bandwidth, and the first sub-bandwidth is spaced apart from the second sub-bandwidth;

wherein] *is on both sides of the range of the frequency resources of* the first bandwidth[is between the first sub-bandwidth and the second sub-bandwidth].

[10. The method of claim 9, wherein a highest frequency of the first sub-bandwidth is equal to a highest frequency of the second bandwidth and a lowest frequency of the second sub-bandwidth is equal to a lowest frequency of the second bandwidth.]

11. A terminal device, comprising:

a transceiver, configured to[receive]*: acquire, on N first symbols, one or more first channels or signals on a first bandwidth, wherein N equals 2, the first channels or signals belong to* a Synchronization Signal Block (SSB)[, the SSB comprising] *transmitted by a network device and comprises a* Primary Synchronization Signal (PSS)[,] *and a* Secondary Synchronization Signal (SSS), [and Physical Broadcasting Channel (PBCH)] *one symbol of the two first symbols is used to transmit the PSS, and the other symbol of the two first symbols is used to transmit the SSS; and*

*acquire, on M second symbols, a second channel or signal in the SSB on a second bandwidth; and acquire, on S first symbols among the N first symbols, the second channel or signal on a third bandwidth,* wherein *M equals 2 and S equals 1, the second channel or signal comprises a Physical Broadcasting Channel (PBCH), a range of frequency resources of the first bandwidth does not overlap with a range of frequency resources of the third bandwidth, and the two first symbols and the two second symbols are sequenced in a time domain by an order of; one of the first symbols, one of the second symbols, another one of the first symbols and another one of the second symbols,* [the SSB comprises four consecutive symbols in time domain, which are symbol S0, symbol S1, symbol S2 and symbol S3 in sequence; and the PSS is transmitted on the symbol S0, the SSS is transmitted on the symbol S2, and the PBCH is transmitted on the symbol S1, the symbol S2 and the symbol S3, wherein a frequency range of the PSS is a first bandwidth and a frequency range of the SSS is the first bandwidth;

wherein a frequency range of the PBCH transmitted on the symbol S1 is a second bandwidth, a frequency range of the PBCH transmitted on the symbol S3 is the second bandwidth, and a frequency range of the PBCH transmitted on the symbol S2 is a third bandwidth; and]

*wherein the range of the frequency resources of the first bandwidth is a subset of a range of frequency resources of the second bandwidth, and the range of the frequency resources of the third bandwidth is a subset of the range of the frequency resources of the second bandwidth, and* wherein the second bandwidth is less than a [frequency range] *bandwidth* of 24 Physical Resource Blocks (PRBs).

[12. The terminal device of claim 11, wherein the third bandwidth has no overlap with the first bandwidth.]

[13. The terminal device of claim 12, wherein the first bandwidth is a subset of the second bandwidth and the third bandwidth is a subset of the second bandwidth.]

14. The terminal device of claim 11, wherein *the range of the frequency resources of* the third bandwidth [comprises a first sub-bandwidth and a second sub-bandwidth, and the first sub-bandwidth is spaced apart from the second sub-bandwidth;

wherein] *is on both sides of the range of the frequency resources of* the first bandwidth[is between the first sub-bandwidth and the second sub-bandwidth].

[15. The terminal device of claim 14, wherein a highest frequency of the first sub-bandwidth is equal to a highest frequency of the second bandwidth and a lowest frequency of the second sub-bandwidth is equal to a lowest frequency of the second bandwidth.]

16. A network device, comprising:

a transceiver, configured to*:* transmit*, on N first symbols, one or more first channels or signals in* a Synchronization Signal Block (SSB) to a terminal device *on a first bandwidth*, [the SSB comprising] *wherein N equals 2, the first channels or signals comprise a* Primary Synchronization Signal (PSS)[,] *and a* Secondary Synchronization Signal (SSS), [and Physical Broadcasting Channel (PBCH)] *one symbol of the two first symbols is used to transmit the PSS, and the other symbol of the two first symbols is used to transmit the SSS*; *and*

*transmit, on M second symbols, a second channel or signal in the SSB to the terminal device on a second bandwidth and transmit, on S first symbols among the N first symbols, the second channel or signal to the terminal device on a third bandwidth,* wherein *M equals 2 and S equals 1, the second channel or signal comprises a Physical Broadcasting Channel (PBCH), a range of frequency resources of the first bandwidth does not overlap with a range of frequency resources of the third bandwidth, and the two first symbols and the two second symbols are sequenced in a time domain by an order of; one of the first symbols, one of the second symbols, another one of the first symbols and another one of the second symbols,* [the SSB comprises four consecutive symbols in time domain, which are symbol S0, symbol S1, symbol S2 and symbol S3 in sequence; and the PSS is transmitted on the symbol S0, the SSS is transmitted on the symbol S2, and the PBCH is transmitted on the symbol S1, the symbol S2 and the symbol S3, wherein a frequency range of the PSS is a first bandwidth and a frequency range of the SSS is the first bandwidth;

wherein a frequency range of the PBCH transmitted on the symbol S1 is a second bandwidth, a frequency range of the PBCH transmitted on the symbol S3 is the second bandwidth, and a frequency range of the PBCH transmitted on the symbol S2 is a third bandwidth; and]

*wherein the range of the frequency resources of the first bandwidth is a subset of a range of frequency resources of the second bandwidth, and the range of the frequency resources of the third bandwidth is a subset of the range of the frequency resources of the second bandwidth, and* wherein the second bandwidth is less than a [frequency range] *bandwidth* of 24 Physical Resource Blocks (PRBs).

[17. The network device of claim 16, wherein the third bandwidth has no overlap with the first bandwidth.]

[18. The network device of claim 17, wherein the first bandwidth is a subset of the second bandwidth and the third bandwidth is a subset of the second bandwidth.]

19. The network device of claim 16, wherein *the range of the frequency resources of* the third bandwidth [comprises a first sub-bandwidth and a second sub-bandwidth, and the first sub-bandwidth is spaced apart from the second sub-bandwidth;

wherein] *is on both sides of the range of the frequency resources of* the first bandwidth[is between the first sub-bandwidth and the second sub-bandwidth].

[20. The network device of claim 19, wherein a highest frequency of the first sub-bandwidth is equal to a highest frequency of the second bandwidth and a lowest frequency of the second sub-bandwidth is equal to a lowest frequency of the second bandwidth.]

*21. The method of claim 1, wherein the second bandwidth is X, the first bandwidth is Y, and a remaining bandwidth X-Y on other symbols of the N first symbols except the S first symbols is used to transmit no channel or signal.*

*22. The method of claim 1, wherein acquiring, by the terminal device on the M second symbols, the second channel or signal in the SSB on the second bandwidth; and acquiring, by the terminal device on the S first symbols among the N first symbols, the second channel or signal on the third bandwidth comprises:*

*de-mapping, by the terminal device in an order of first frequency and then time, the second channel or signal, wherein the de-mapping starts from a starting symbol among the N first symbols and the M second symbols, and the de-mapping is performed in a sequential order of the N first symbols and the M second symbols in the time domain, and the de-mapping is performed from low-frequency resource to high frequency resource, wherein a bandwidth de-mapped on the first symbol is the third bandwidth and a bandwidth de-mapped on the second symbol is the second bandwidth.*

*23. The method of claim 1, wherein a bandwidth occupied by the SSB has an association relationship with a value of a synchronization channel raster for cell search, the association relationship comprising: the bandwidth occupied by the SSB is larger, the value of the synchronization channel raster for cell search is smaller.*

*24. The method of claim 6, wherein the second bandwidth is X, the first bandwidth is Y, and a remaining bandwidth X-Y on other symbols of the N first symbols except the S first symbols is used to transmit no channel or signal.*

*25. The method of claim 6, wherein*

*a sequence length of the PSS is 127 and the PSS occupies 127 Resource Elements (REs);*

*a sequence length of the SSS is 127 and the SSS occupies 127 REs; and the PBCH occupies 576 REs in total.*

*26. The method of claim 6, wherein a bandwidth occupied by the SSB has an association relationship with a value of a synchronization channel raster for cell search, the association relationship comprising: the bandwidth occupied by the SSB is larger, the value of the synchronization channel raster for cell search is smaller.*

*27. The terminal device of claim 11, wherein the second bandwidth is X, the first bandwidth is Y, and a remaining bandwidth X-Y on other symbols of the N first symbols except the S first symbols is used to transmit no channel or signal.*

*28. The terminal device of claim 11, wherein*

*a sequence length of the PSS is 127 and the PSS occupies 127 Resource Elements (REs);*

*a sequence length of the SSS is 127 and the SSS occupies 127 REs; and the PBCH occupies 576 REs in total.*

*29. The terminal device of claim 11, wherein a bandwidth occupied by the SSB has an association relationship with a value of a synchronization channel raster for cell search, the association relationship comprising: the bandwidth occupied by the SSB is larger, the value of the synchronization channel raster for cell search is smaller.*

*30. The network device of claim 16, wherein the second bandwidth is X, the first bandwidth is Y, and a remaining bandwidth X-Y on other symbols of the N first symbols except the S first symbols is used to transmit no channel or signal.*

*31. The network device of claim 16, wherein the transceiver is further configured to: map, in an order of first frequency and then time, the second channel or signal, wherein mapping starts from a starting symbol among the N first symbols and the M second symbols, and the mapping is performed in a sequential order of the N first symbols and the M second symbols in the time domain, and the mapping is performed from low-frequency resource to high frequency resource, wherein a bandwidth mapped on the first symbol is the third bandwidth and a bandwidth mapped on the second symbol is the second bandwidth; and transmit a mapped second channel or signal to the terminal device.*

*32. The network device of claim 16, wherein a bandwidth occupied by the SSB has an association relationship with a value of a synchronization channel raster for cell search, the association relationship comprising: the bandwidth occupied by the SSB is larger, the value of the synchronization channel raster for cell search is smaller.*

* * * * *